United States Patent [19]

Schuler

[11] Patent Number: 5,440,078
[45] Date of Patent: Aug. 8, 1995

[54] PORTABLE SCALE WITH LOAD CELL

[75] Inventor: Daniel D. Schuler, Griswold, Iowa

[73] Assignee: Schrran Engineering, Inc., Griswold, Iowa

[21] Appl. No.: 92,876

[22] Filed: Jul. 19, 1993

[51] Int. Cl.6 .......................... G01G 3/14; G01G 3/08
[52] U.S. Cl. .................................. 177/211; 177/229; 73/862.627
[58] Field of Search .............................. 177/211, 229; 73/862.627

[56] References Cited

U.S. PATENT DOCUMENTS

| 4,203,497 | 5/1980 | Harris | 177/134 |
| 4,492,279 | 1/1985 | Speckhart | 177/229 X |
| 4,714,121 | 12/1987 | Kroll et al. | 177/134 |
| 4,763,740 | 8/1988 | Pattern | 177/229 X |
| 4,775,018 | 10/1988 | Kroll et al. | 177/134 |

Primary Examiner—Peter S. Wong
Assistant Examiner—Randy W. Gibson
Attorney, Agent, or Firm—Zarley, McKee, Thomte, Voorhees & Sease

[57] ABSTRACT

A load cell for scales and the like has an elongated bar having opposite sides, sloped ends and a removable top portion. A pair of load cells are mounted within the housing with each load cell comprising an elongated bar having opposite ends, opposite sides, a center portion, and top and bottom surfaces. The bar has cavity openings extending into the sides thereof adjacent each of the opposite ends. A strain gauge is mounted in each of the cavity openings and is sensitive to deflection of the bar caused by weight exerted on the top surface of the bar. Each of the strain gauges are connected to a visual readout apparatus which collectively reflects the loads imposed upon the bars. A cantilever support element is positioned on the bottom surface of the bars and has a length less than the bars to create a space below the bottom thereof and a support surface upon which the cantilever support bar is positioned to suspend the ends of the bar in cantilever fashion.

15 Claims, 2 Drawing Sheets

PORTABLE SCALE WITH LOAD CELL

BACKGROUND OF THE INVENTION

Portable scales using strain gauge load cells are common in the prior art. A typical device of the prior art is shown in U.S. Pat. No. 4,714,121. These devices are adapted to support the wheels of a vehicle. The downward weight of the vehicle on the scale and the load cells thereof is transmitted electronically to a visible data readout system whereby the weight of the vehicle can be ascertained.

The load cells of such portable scales utilize conventional strain gauges whereupon the deflection of the load cells is measured by the strain gauges and is transmitted to the readout apparatus which assimilates the collective readings from the individual portable scales located under the various wheels of the vehicle.

The load cells of the prior art are normally comprised of an elongated bar. U.S. Pat. No. 4,775,018 shows such a bar having an elongated slot therein. When weight deflects the bar and compresses the slot, strain gauge therein measure the deflection of the bar and this data is transmitted to the readout apparatus.

Other load cells of the prior art utilize an elongated bar which is supported on one end and which has the other end suspended in cantilever fashion. A strain gauge is placed within a cavity in the cantilevered end of the bar, and the strain gauge measures deflection of the cantilever end of the bar in conventional fashion. Load cells of this type are commonly used in pairs with the bars being positioned in alignment, and the cantilevered ends thereof extend in opposite directions from the inner ends which support the bar on a supporting surface.

Among the shortcomings of the prior art devices is that they do not possess the strength which is often required to weigh large and heavy vehicles. Further, the top plate of the scales of the prior art using these load cells often engage the load cells in such a manner that the top plates are damaged as the vehicle wheels are supported thereby. In addition, a plurality of load cells are often required for each portable scale (sometimes four in number) and this large number of load cells often exceeds the capacity of the readout equipment. The portable scales of the prior art are often very heavy even though they can be manually moved from one place to another.

It is therefore a principal object of this invention to provide a load cell for a portable scale which is strong, relatively light in weight, easily mounted in a scale housing, and capable of operationally housing more than one strain gauge.

A further object of this invention is to provide a portable scale utilizing a load cell that can assume the weight being imposed thereon by the top plate of the scale without resulting in deformation or other damage to the top plate of the scale.

A still further object of this invention is to provide a portable scale utilizing load cells which minimizes the number of load cells required per scale, and wherein the load scale is easily installed in the scale housing and easily serviced.

These and other objects will be apparent to those skilled in the art.

SUMMARY OF THE INVENTION

A portable scale with a load cell of this invention has a housing with a bottom, opposite sides, sloped ends and a removable top portion. A pair of load cells are mounted within the housing with each load cell comprising an elongated bar having opposite ends, opposite sides, a center portion, and top and bottom surfaces. The bar has cavity openings extending into the sides thereof adjacent each of the opposite ends. A strain gauge is mounted in each of the cavity openings and is sensitive to deflection of the bar caused by weight exerted on the top surface of the bar. Each of the strain gauges are connected to a visual readout apparatus which collectively reflects the loads imposed upon the bars. A cantilever support element is positioned on the bottom surface of the bars and has a length less than the bars to create a space below the bottom thereof and a support surface upon which the cantilever support bar is positioned to suspend the ends of the bar in cantilever fashion.

DESCRIPTION OF THE PREFERRED EMBODIMENT

Figure 2:
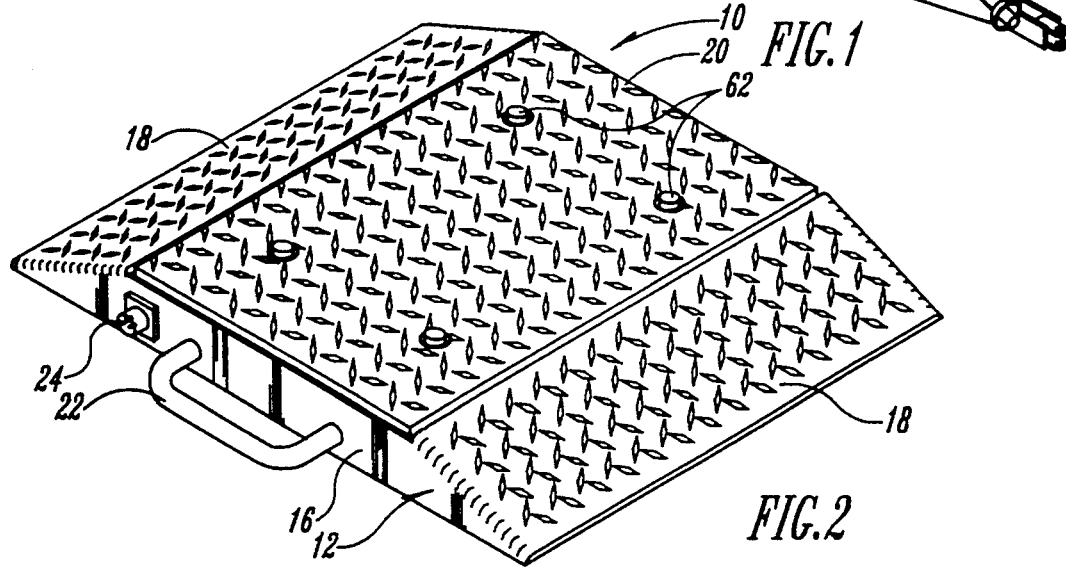
FIG. 2 is a perspective view of the portable scale of this invention shown at an enlarged scale.
Figure 3:
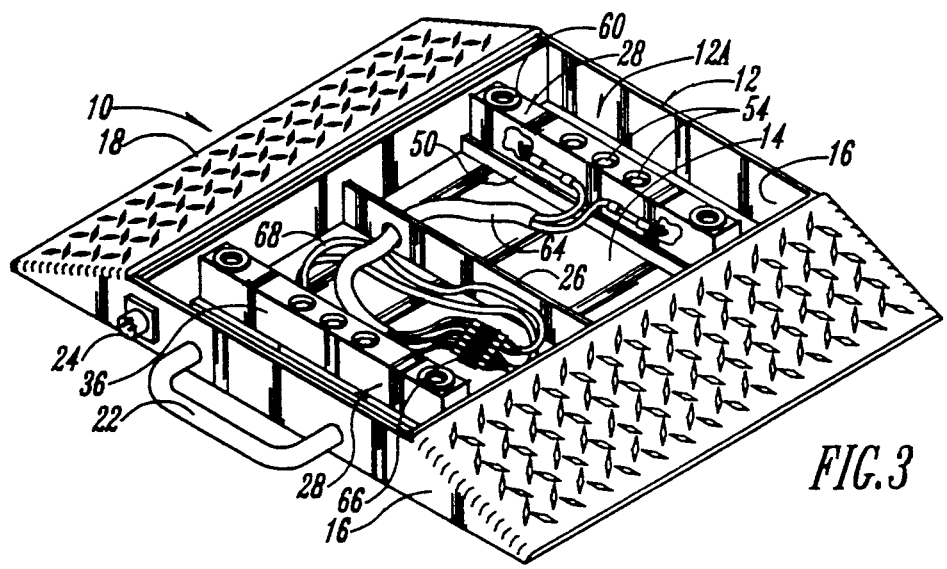
FIG. 3 is a perspective view of a portable scale of this invention similar to that of FIG. 2, but with the top plate removed therefrom.
Figure 4:
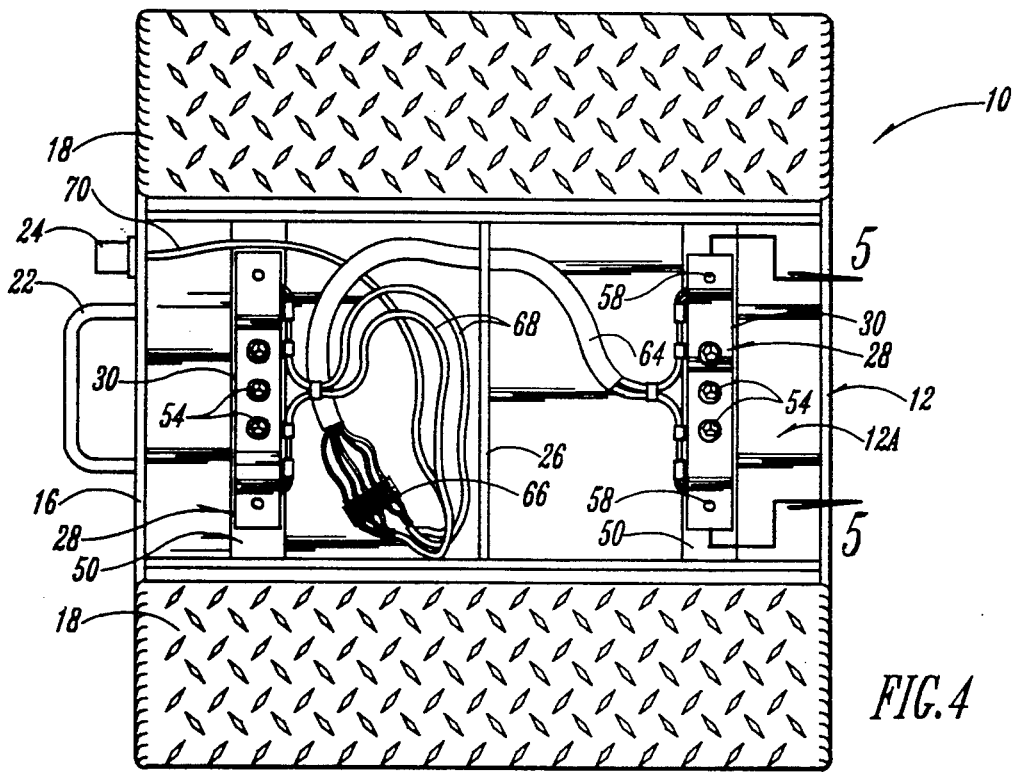
FIG. 4 is an enlarged scale plan view of a device of FIG. 3.

The numeral 10 designates the portable scale of this invention which is comprised of housing 12 having an interior compartment 12A. Housing 12 has a bottom 14, side 16, sloping ends 18, and a removable top 20. An outwardly extending handle 22 is welded or otherwise secured to one of the sides 16. As shown in FIGS. 2, 3 and 4, an electrical connector 24 is also mounted in one of the sides 16. A stabilizer wall 26 extends across the center of interior compartment 12A (FIGS. 3 and 4).

Two load cells 28 (FIGS. 3 and 4) are mounted within compartment 12A. These load cells are identical in structure and function. The load cells 28 are comprised of a bar 30 (see FIGS. 5 and 6) having a top surface 32, a bottom surface 34, sides 36, ends 38, and a center portion 40. Cavity openings 42 extend inwardly in the sides 36 adjacent the opposite ends 38 of the bar 30 to create a narrow web 44 (FIG. 6). Strain gauges 46 of conventional construction are mounted in two of the cavity openings 42 adjacent web 44. A cantilever plate 48 is positioned on the bottom surface 34 of bar 30 and has a length less than the length of bar 30. Plate 48 could be made integral with bar 30. A bar pad 50 is welded or otherwise secured to the bottom 14 of housing 12 on the upper portion thereof, and the bars 30 are supported on the bar pads 50 through the engagement of cantilever plates 48 on the bottom 14.

Figure 5:
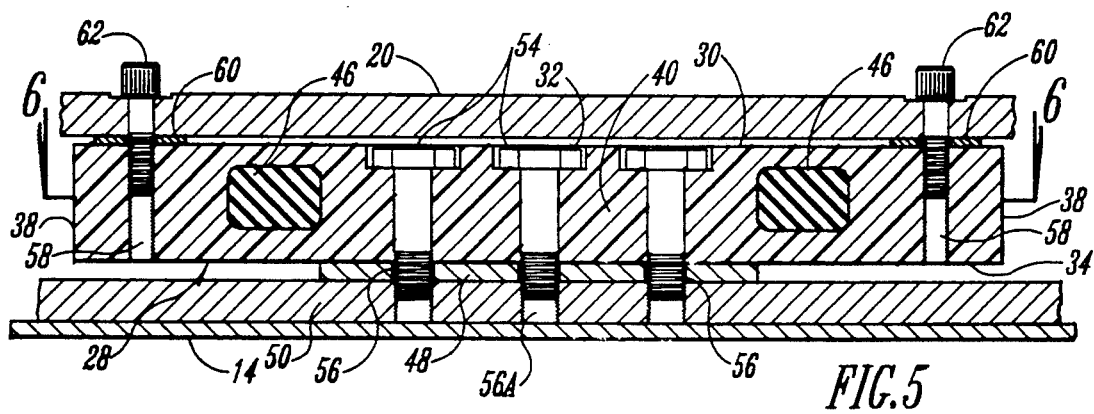
FIG. 5 is an elongated sectional view at an enlarged scale taken on line 5—5 of FIG. 4.
Figure 6:
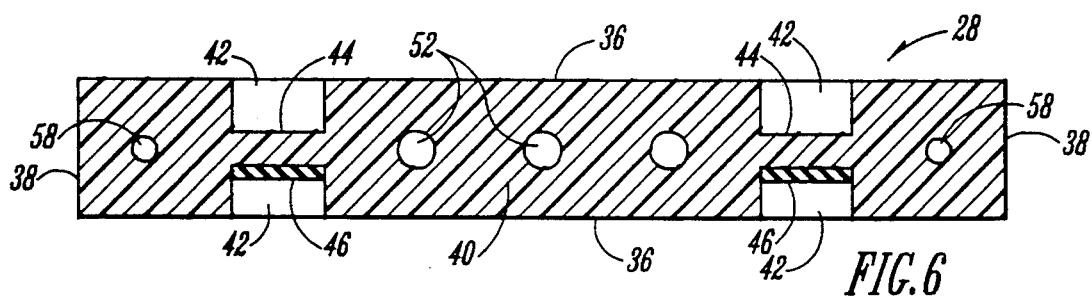
FIG. 6 is a sectional view taken on line 6—6 of FIG. 5.

With reference to FIGS. 5 and 6, apertures 52 extend vertically through the center portion 40 of bars 30 to receive countersunk bolts 54. Apertures 52 also extend through cantilever plate 48 as best shown in FIG. 5. The lower ends of bolts 54 are threaded and are threadably received within apertures 56A which are positioned in alignment with apertures 56.

Vertically disposed apertures 58 extend through the ends 38 of bars 30, and washers 60 are positioned on the top surface 32 of bar 30 around the upper ends of these apertures. Bolts 62 extend through suitable apertures in top plate 20 and extend downwardly through washers 60 and are threadably mounted within apertures 58. As a result, the top plate 20 is suspended on the load cells 28 by resting on the washers 60.

Figure 1:
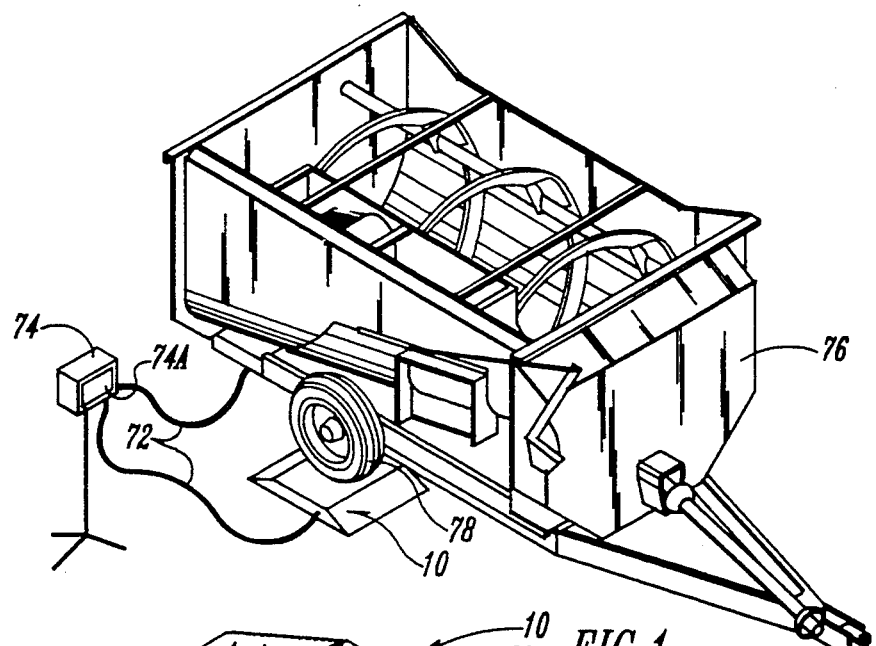
FIG. 1 is a perspective view of the portable scale of this invention with a vehicle being weighed thereon.

With reference to FIG. 4, a wiring harness 64 is electrically connected to each of the strain gauges on the load cell 28 shown on the right hand side of the drawing. The wiring harness extends through the stabilizer wall 26 and the wires contained therein are conventionally connected to connector 66. Similarly, leads 68 extend from the strain gauges 46 in the load cell 28 on the other side of the device as shown in FIG. 4, and the opposite ends thereof are also connected to the connector 66. Lead 70 then extends from connector 66 to the electrical connector 24 on the side 16 of housing 12 as shown in FIG. 4. A conventional lead 72 then extends from connector 24 to the digital readout apparatus 74 as best shown in FIG. 1.

In operation, the portable scale as shown in FIG. 2 is carried to the desired location by manually grasping the handle 22. For a four-wheeled vehicle, four of the scales 10 would be spaced to support the four wheels of the vehicle. Each scale would have a lead 72 which is connected to the readout apparatus 74. With reference to FIG. 1, a feed mixing wagon 76 having at least a pair of wheels 78 will utilize two of the scales 10 with one scale being under each of the wheels 78. With the readout apparatus 74 being connected to a conventional source of power (not shown) the conventional readout apparatus 74 receives the data from each of the portable scales 10 through the leads 72, assimilates this data, and visually displays the total weight being imposed on the collection of scales 10.

It is therefore seen that the device of this invention will provide load cells which overcome the shortcomings of the prior art, and which will achieve all of the stated objects of this invention.

I claim:

1. A load cell for scales comprising;
   an elongated bar having opposite ends, opposite sides, a center portion, and a top surface and a bottom surface,
   said bar having cavity openings extending into the sides thereof adjacent each of said opposite ends,
   a strain gauge in each of said cavity openings and being sensitive to deflection of said bar caused by downward forces exerted on the top surface of said bar,
   means on said strain gauges for connection to means for receiving deflection data from said strain gauges,
   a cantilever support portion centrally positioned on the bottom surface of said bar and having a length less than said bar to create a space below the bottom surface of said bar and to create a support surface upon which cantilever support bar is positioned,
   said opposite ends and said cavity openings of said bar being suspended in cantilever fashion from said center of said bar, and
   load receiving elements rigidly fixed on said bar inwardly adjacent said opposite ends and outwardly adjacent said cantilever support portion.

2. The load cell of claim 1 wherein said cantilever support portion is a flat plate.

3. The load cell of claim 1 wherein said cantilever support portion is of integral construction with said bar.

4. The load cell of claim 1 wherein said load receiving elements are positioned on said top surface of said bar.

5. The load cell of claim 1 wherein mounting means are positioned in said center portion of said bar to receive said bar to a supporting surface.

6. A portable scale, comprising,
   a housing having a bottom, opposite sides, sloped ends, and a removable top portion,
   at least one load cell mounted within said housing,
   said load cell comprising an elongated bar having opposite ends, opposite sides, a center portion, and a top surface and a bottom surface,
   said bar having cavity openings extending into the sides thereof adjacent each of said opposite ends,
   a strain gauge in each of said cavity openings and being sensitive to deflection of said bar caused by downward forces exerted on the top surface of said bar,
   means on said strain gauges for connection to means for receiving deflection data from said strain gauges,
   a cantilever support portion centrally positioned on the bottom surface of said bar and having a length less than said bar to create a space below the bottom surface of said bar and the bottom of said housing,
   said opposite ends and said cavity openings of said bar being suspended in cantilever fashion from said center portion of said bar, and
   load receiving elements rigidly fixed on said top surfaces of said bar inwardly adjacent said opposite ends, and said top portion of said housing engages said load receiving elements.

7. The portable scale of claim 1 wherein said cantilever support portion is a flat plate.

8. The portable scale of claim 7 wherein said cantilever support portion is of integral construction with said bar.

9. The portable scale of claim 6 wherein said load receiving elements are flat washer elements.

10. The portable scale of claim 6 wherein an elongated pad bar is secured to the bottom of said housing, and said cantilever support portion is mounted on said pad bar.

11. The portable scale of claim 6 wherein a pair of said load cells are mounted within said housing.

12. The portable scale of claim 11 wherein said load cells are symmetrically positioned within said housing.

13. The portable scale of claim 6 wherein a plurality of securing elements extend through the center portion of said bar and said cantilever support portion to secure said bar in position within said housing.

14. The portable scale of claim 9 wherein bolt elements extend downwardly through a top plate mounted on said washers and are attached to the opposite ends of said bar.

15. A load cell for scales comprising;
   an elongated bar having opposite ends, opposite sides, a center portion, and a top surface and a bottom surface, said bar having cavity openings extending into the sides thereof adjacent each of said opposite ends, a strain gauge in each of said cavity openings and being sensitive to deflection of said bar caused by downward forces exerted on the top surface of said bar, means on said strain gauges for connection to means for receiving deflection data from said strain gauges, a cantilever support portion centrally positioned on the bottom surface of said bar and having a length less than said bar to create a space below the bottom surface of said bar and to create a support surface upon which cantilever support bar is positioned, said opposite ends and said cavity openings of said bar being suspended in cantilever fashion from said center of said bar, and a pair of load receiving elements rigidly fixed directly on said top surface of said bar, one of said load receiving elements being located outwardly of one of said cavity openings and inwardly adjacent one of said opposite ends, another of said load receiving elements being located outwardly of another of said cavity openings and inwardly adjacent another of said opposite ends.

* * * * *